No. 746,148. PATENTED DEC. 8, 1903.
D. T. PHILLIPS.
SHOCKING ATTACHMENT FOR CORN HARVESTERS.
APPLICATION FILED JAN. 26, 1903.
NO MODEL. 3 SHEETS—SHEET 1.
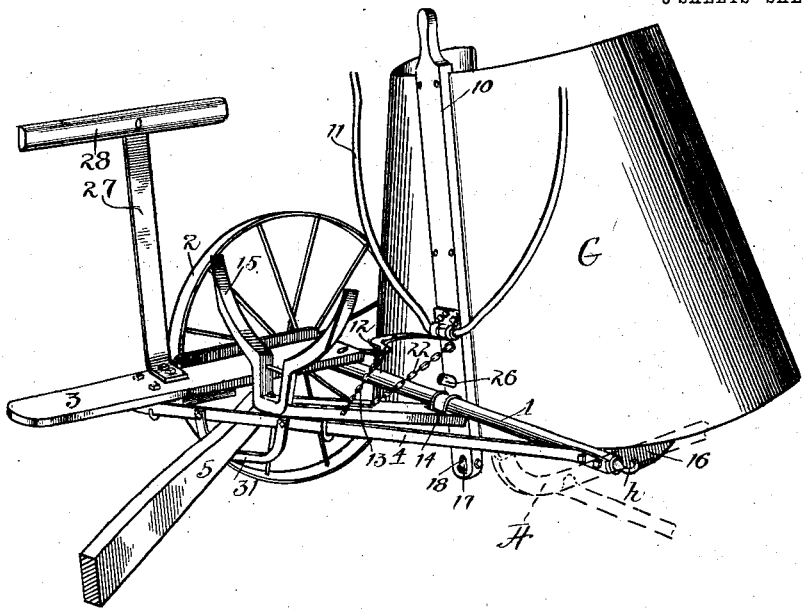
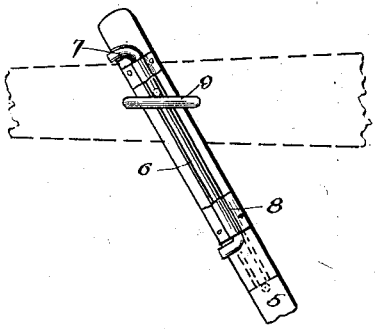
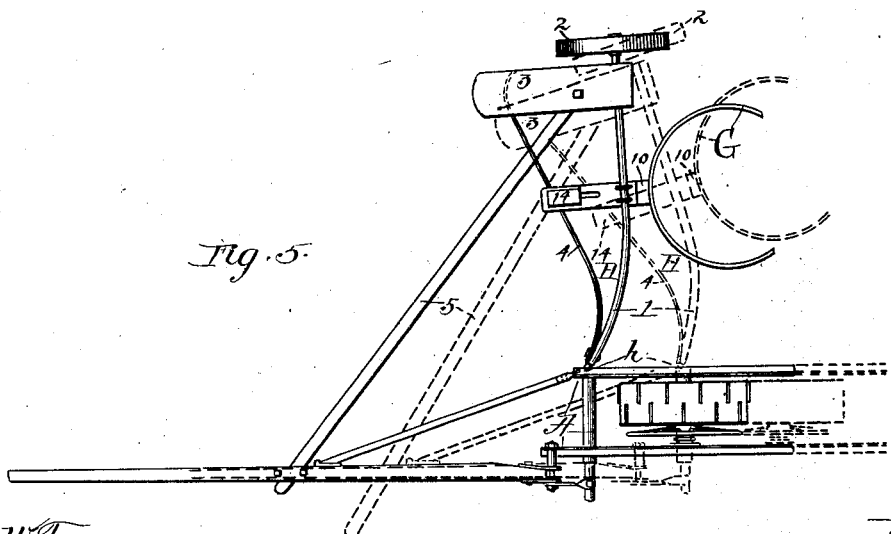
Witnesses
T. H. Alfred
J. C. Warner
Inventor
Darius Tennet Phillips No. 746,148. PATENTED DEC. 8, 1903.
D. T. PHILLIPS.
SHOCKING ATTACHMENT FOR CORN HARVESTERS.
APPLICATION FILED JAN. 26, 1903.
NO MODEL. 3 SHEETS—SHEET 2.
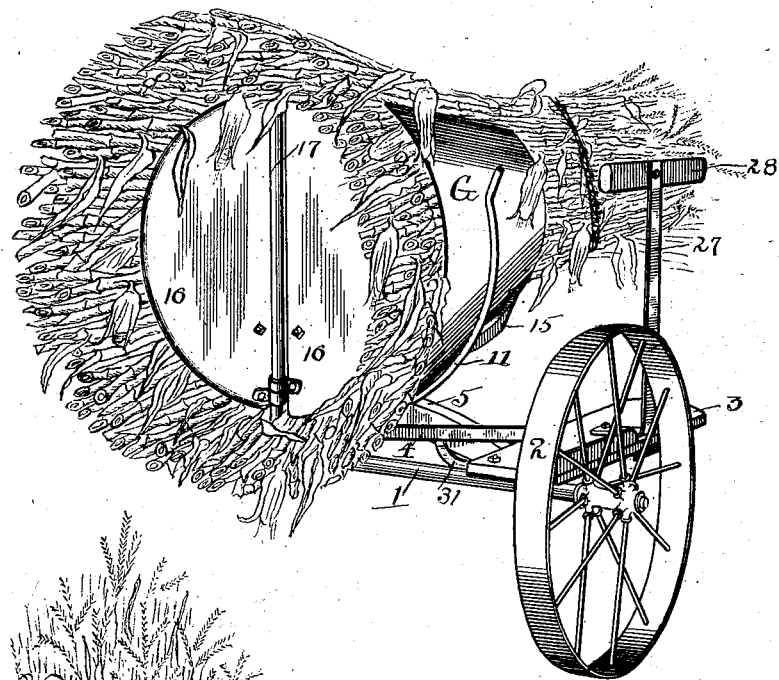
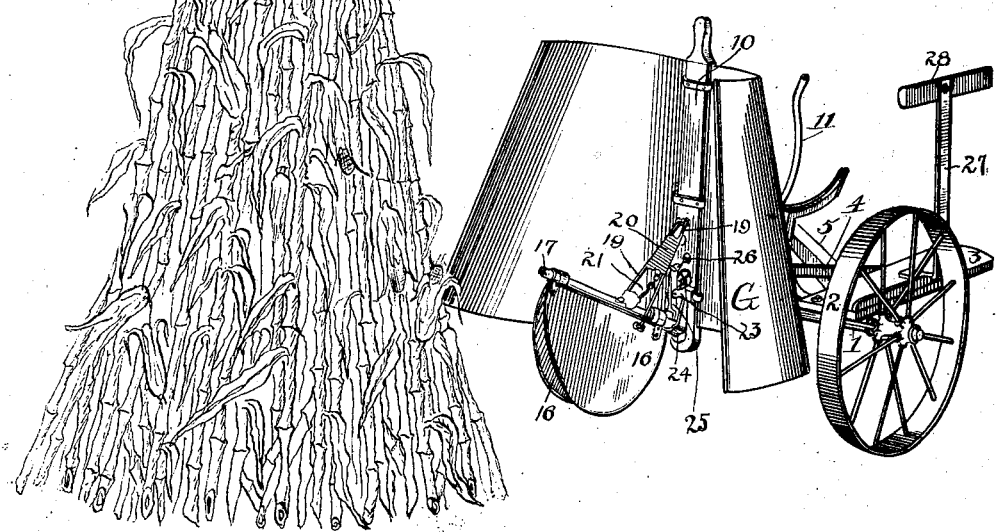
Witnesses:
Inventor.
Darius Tennet Phillips No. 746,148. PATENTED DEC. 8, 1903.
D. T. PHILLIPS.
SHOCKING ATTACHMENT FOR CORN HARVESTERS.
APPLICATION FILED JAN. 26, 1903.
NO MODEL. 3 SHEETS—SHEET 3.
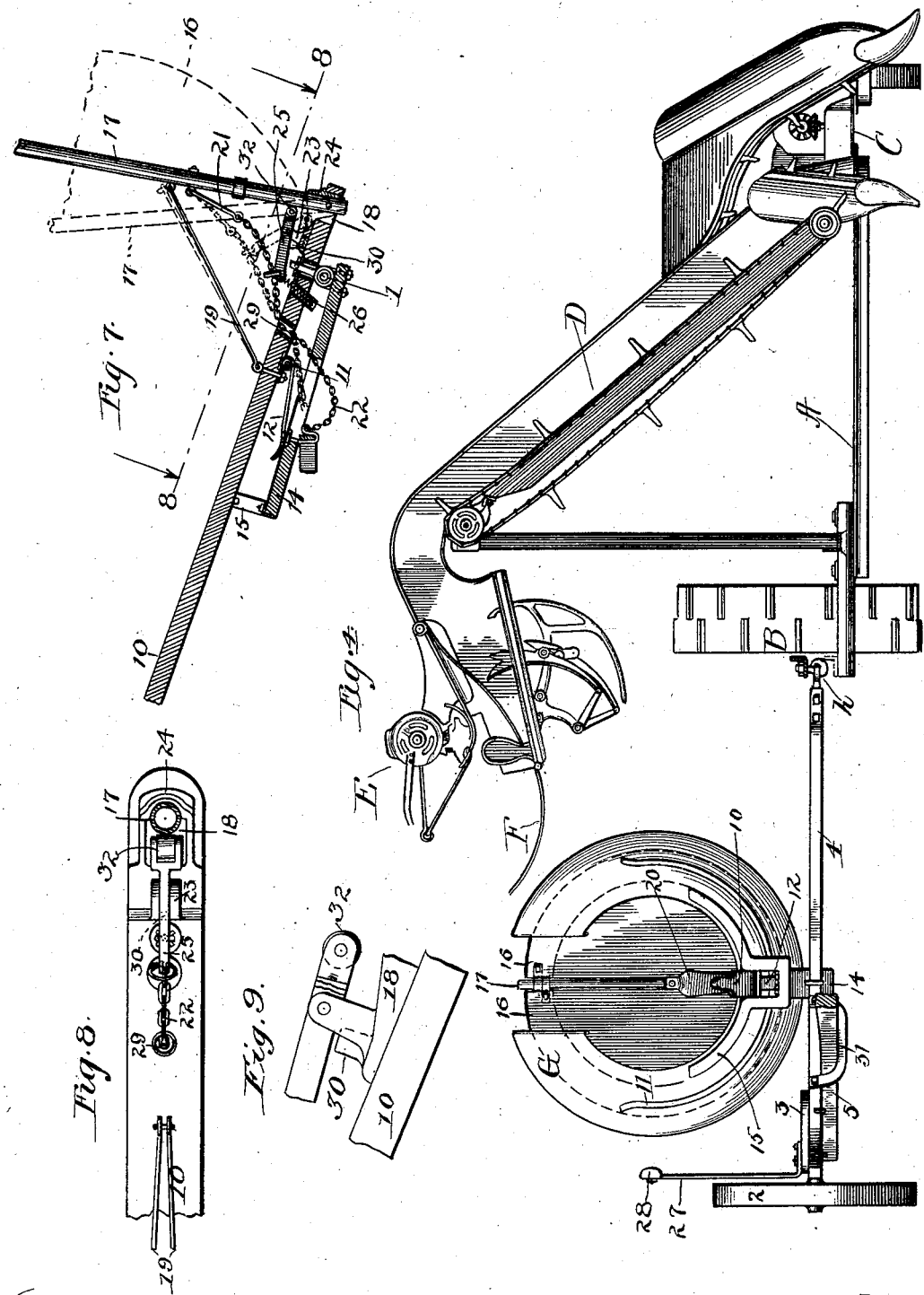

No. 746,148.                                                                                                       Patented December 8, 1903.

UNITED STATES PATENT OFFICE.

DARIUS TENNET PHILLIPS, OF CHICAGO, ILLINOIS, ASSIGNOR TO THE INTERNATIONAL HARVESTER COMPANY, A CORPORATION OF NEW JERSEY.

SHOCKING ATTACHMENT FOR CORN-HARVESTERS.

SPECIFICATION forming part of Letters Patent No. 746,148, dated December 8, 1903.

Application filed January 26, 1903. Serial No. 140,513. (No model.)

*To all whom it may concern:*

Be it known that I, DARIUS TENNET PHILLIPS, of Chicago, in the county of Cook and State of Illinois, have invented a new and useful Improvement in Shocking Attachments for Corn-Harvesters, of which the following is a complete specification.

My improvement relates to a shock-forming and shock-depositing device used in connection with corn-harvesting machines, and is particularly applicable to that class of machines which in their operation prostrate the corn forwardly in such a manner as do those shown in patents granted to me, No. 587,535, of August 3, 1897, or No. 605,050, of June 14, 1898. Heretofore more or less difficulty has been encountered in devices of this kind, arising from the fact that the shocks made thereby persist in leaning or falling to the ground at the time they are deposited or shortly thereafter. This behavior of the shocks is due largely to the faulty formation and insufficient base thereof, and it is with the view of overcoming this difficulty that my invention is designed.

Referring to the drawings, Figures 1, 2, and 3 are perspective views of my improvement shown detached from the corn-harvesting machine, Fig. 1 being a view from the front and grain side thereof, showing the shock-forming receptacle tilted to an approximately vertical position and a fragment of the main frame to which it is secured in dotted lines to the right, Fig. 2 being a rearward and stubbleward view of same, showing the manner of forming the shock with the butts of the stalks disposed about the folding circular head, the shock being shown completed and ready for dumping. Fig. 3 represents the shocker attachment and shock after the shock has been deposited. Fig. 4 is a front elevation of the principal working parts of a corn-harvesting machine operating on the principles set forth in the patents to which reference has been made and showing my improvement in connection therewith. The machine shown, however, is adapted to cut only one row of corn at a time. Fig. 5 is a plan view of the frame supporting the shock-forming receptacle and shown connected to the tongue and a portion of the harvester-frame. The dotted lines in this figure show the position of the shocker-frame before dumping, illustrating how, by the flexible and sliding connection between the shocker-frame and main frame, the shock is deposited farther stubbleward by causing the main frame to move rearwardly a short distance. Fig. 6 is a view from beneath showing the peculiar sliding connection between the brace of the frame of the shocker and the tongue of the machine. Fig. 6ª is a transverse sectional view of the portion of the brace shown in Fig. 6. Fig. 7 is a detail of the dumping and tripping mechanism, the dotted lines indicating the relative position of the standard, the folding head, and the tripping-lever when in this tripped and folded position; and Fig. 8 is an enlarged plan of a portion of the tripping mechanism, taken as indicated by the line 8 8 on Fig. 7. Fig. 9 is a fragmentary detail designed to show the stop on the post supporting the lever which trips the folding bottom.

In the drawings, A represents the main frame of a corn-harvesting machine; B, the main supporting-wheel thereof; C, the cutting apparatus of the said machine; D, the elevator, and E the binding mechanism of same.

F is a stalk or bundle receiving cradle intermediate of the binding mechanism E and the shock-forming receptacle G. The shock-forming receptacle G is mounted on a frame H by a double pivotal joint, thereby adapting it to be swung in planes both transverse and longitudinal with respect to the frame on which it is mounted, thus permitting the shock thereon to be tilted to and deposited in a vertical position.

As before stated, the machine in harvesting the corn prostrates the stalks forwardly, so that they are ejected from the binder with the butts rearward, and thus adapted to be handled in the manner set forth.

Describing the construction of the shocker attachment more specifically, the frame H, (see Fig. 5,) which is preferably triangular, consists, essentially, of the axle 1, extending laterally stubbleward from the machine and flexibly secured to the frame thereof at the point h. The axle 1 shown in Fig. 5 is a modified form of the one shown in Figs. 1, 2, and 3, the modification consisting in the forward bend given it at its grainward end, the object being to secure the said axle to the main frame at a point longitudinally in advance of the supporting-wheel on the stubbleward end of said axle. The purpose of this bend in the axle is to locate the pivotal connection between it and the main frame at a point which will cause it to have movement on either side of a transverse line passing through the frame-supporting wheel, and thereby result in the least possible transverse movement of the said axle in its supporting-wheel when the harvesting-machine is moved rearwardly by the team. The supporting-wheel 2 is mounted near the outer end of said axle 1, and a longitudinal footboard 3 is secured to the axle near its outer end adjacent to said supporting-wheel and projects forwardly therefrom. A brace 4 connects the forward end of said footboard 3 with the inner end of the axle 1, and a brace 5, which is pivotally secured to the footboard and slidably connected to said brace 4 by a C-shaped strap 31, (see Fig. 1,) extends forwardly and grainwardly to the tongue, to which it is also slidably connected in the manner shown in Fig. 6. In this figure the dotted lines represent the tongue, the view being taken from beneath, and 6 is a rod provided with bent ends 7, located in a recess in the bottom of the said brace 5. The rod is retained in said recess by the plate 8, the central portion of which is shown broken away. A yoke-bolt 9, passing through the tongue and loosely engaging the brace 5 at a point between the bent ends 7 of the rod 6, sustains and guides said brace, the said bent ends when turned down or to a vertical position limiting the relative movement of the brace and tongue by engaging the yoke-bolt 9. The forward bent end 7 normally engages the yoke-bolt 9 and sustains the pull of the shocker attachment. When the machine is caused to move backward, the brace 5 slides through the said yoke-bolt until the inner or rear end engages the same, and in this movement the shocker attachment simply turns on the supporting-wheel 2 as a pivotal center, the rear end thereof moving stubbleward, as shown in dotted lines in Fig. 5. The slight variation in distance between the supporting-wheel 2 and the main frame A is provided for by permitting the axle to slide a short distance through said wheel when the team pushes the machine rearwardly. If it is desired to detach the shocking device from the machine, the rod 6 is turned until the bent ends thereof occupy a non-engaging position relative to said yoke-bolt 9, which will allow the brace to be readily withdrawn and the inner end of the axle 1 to be unhooked from the main frame. The foregoing details of these connections set forth the preferred construction thereof; but it is evident that any arrangement would serve equally as well which would provide this slidable connection limited in its movement.

The shock-forming receptacle consists, preferably, of a sheet-iron shell, the conformation thereof being that of a truncated cone with an opening in the upper side for the introduction of the stalks or bundles of corn. This shell is secured to the rigid base 10, which in turn is mounted with a double pivotal bearing on the axle 1 of the frame H, as shown in Fig. 7. The forward end of this base-piece 10 forms a handle by which the receptacle is tilted, and pivotally secured on the under side thereof is the yoke 11, actuated by the lever 12, rigidly secured to the pivotal axis thereof. This yoke normally embraces approximately half of the said receptacle, as shown in Fig. 2; but when the shock therein is dumped and the shocker occupies the position shown in Figs. 1 and 3 the yoke is automatically withdrawn, as shown in these figures. This is accomplished by the chain 13, which connects said arm 12 to a fixed part of the frame. The withdrawal of the yoke from the receptacle will allow the latter to spread and be withdrawn from the shock. On returning the said receptacle to its normal position the yoke will be returned automatically to its position about the receptacle by the foot on the free end of the lever 12 contacting the longitudinally-disposed member 14, which is secured to the axle 1 and brace 4, as shown in Figs. 2 and 7. The saddle 15, (see Figs. 1, 2, and 3,) which is secured to the forward end of the member 14, is provided with arms conforming approximately to the curvature of the receptacle when closed, where it contacts said arms, thus forming a rest for the forward end of the said receptacle and the shock contained therein. In the rear end of the conical shell is located an automatically-folding head, around which the shock is formed and spread in the formation thereof, (see Figs. 2, 3, and 4,) the construction of the said head being substantially as follows: Corresponding semicircular disks 16 are hinged to a standard 17, the lower end of which is pivoted in a longitudinal slot 18 (see Figs. 7 and 8) in the casting 24, which is secured to the rear or lower end of the base-plank 10. Secured to an eyebolt in the base-plank 10 are the two rods 19, extending rearwardly and upwardly, diverging and flexibly connected to the said semicircular disks 16 at points laterally disposed from the hinged axes thereof, as shown in Fig. 3. A guard 20, (see Fig. 4,) of sheet metal, deflects the stalks from between the said rods 19. Secured to the standard 17 at a point somewhat nearer the base 10 than are the rods 19 is the rod 21, forming a part of the chain 22 attached, which extends through an aperture 29 in the said base 10 and connects with the fixed member 14, as shown in Fig. 7. Secured to the rear end of the member 14 is the short slotted post 23, (see Figs.

7 and 8,) preferably integral with the casting 24, which forms the pivotal bearing for the standard 17. On this post fulcrums the lever 25, and on the rearwardly-extending arm of this lever is journaled an antifriction-roller 32, which contacts the standard 17. This lever when actuated by the said chain 22, which passes through an aperture in the end of the forwardly-extending arm thereof, operates to trip the folding head by throwing the roller-bearing arm "off center" and permitting the standard 17 to swing forward on its pivotal bearing, and thus allow the half-disks which are hinged thereto and pivotally held by the rods 19 to fold together, as shown in Figs. 3 and 7. A tension-spring 26 is secured to the forward end of this lever 25 and operates to return the lever, the standard 17, and the folding disks 16 thereon to normal position after dumping by pressing rearwardly the said standard. Locking of the several elements in their normal positions is effected by the said spring holding the roller-bearing arm of the lever 25 on "dead-center" relative to said standard 17, a stop 30 on said post 23 preventing said spring 26 from pulling the lever beyond the dead-center. The dotted lines in Fig. 7 indicate the relative position when tripped of the standard 17, disks 16, and chain and tripping-lever and rods 19. The full lines in Fig. 7 show the arm of lever 25 in its locking position.

27 is a post, and 28 a transverse member secured to the top thereof, affording a rest for the operator, said post fixed at its base to the frame of the shocker attachment and extending upwardly, as shown in Figs. 1, 2, 3, and 4.

The operation of the machine is as follows: As the harvester advances upon the row of corn the corn is cut, elevated, bound into bundles, and discharged upon the bundle-receiving cradle F, the butts thereof extending rearwardly. From this cradle the operator takes the bundles and places them within the shock-forming receptacle until the tops fill the space at the upper or forward end thereof and the butts fill the space between the circular folding head and base of said shock-former. The shock being then tied, the receptacle is tilted up in front, and as it approaches a vertical position the head-forming disks 16 are automatically folded together, and the yoke 11, which restrains the spreading of the sides of the said receptacle when the shock is being formed, is automatically withdrawn. A hollow shock is thus deposited vertically upon the ground, and the yielding sides and folding bottom allow the shock-former to be withdrawn therefrom. The broad base and hollow formation given the shock will enable it to effectually withstand the forces tending to twist, lean, or prostrate it upon the ground and incidentally facilitate the curing thereof. Before tilting the receptacle and depositing the shock the harvesting-machine is caused to move rearward a short distance by backing the team, and by the flexible sliding connection between the brace 5 and tongue of the machine, heretofore described, the rear end of the said receptacle is thrown away from the machine, thus depositing the shock farther stubbleward than would otherwise be possible. This movement is just sufficient to bring the shock to a non-interfering position relative to the machine in the succeeding round. The shock-forming apparatus having deposited the shock, it is again tilted to a horizontal position, the mechanism described operating to return automatically to normal position the folding head and restraining-yoke. The bundles that are formed during the tying of said shock accumulate in the cradle F.

The folding disks 16 may be made as large as desired, thus spreading to any required degree the butts of the stalks forming the shock, or they may be made smaller, as shown by dotted lines in Fig. 4.

What I claim as my invention, and desire to secure by Letters Patent, is—

1. In a shocking attachment for corn-harvesters, a frame and frame-supporting wheel, a shock-forming receptacle pivotally mounted on said frame, a centrally-disposed folding head operatively connected to the base thereof, and means for automatically opening and closing the folding head, the said folding head being diametrically smaller than and concentric with the base of said receptacle, all combined substantially as described.

2. In a shocking attachment for corn-harvesters, a frame and frame-supporting wheel, a shock-forming receptacle pivotally mounted on said frame, an automatically-actuated, folding circular head, and a releasably-secured wall-retaining yoke adapted to normally embrace said shock-receiving receptacle, all combined substantially as described.

3. In a shocking attachment for corn-harvesters, a frame and frame-supporting wheel, a shock-forming receptacle pivotally mounted on said frame, a folding head consisting of a standard pivotally secured to the base of said receptacle, and semicircular disks hinged to said standard, a tripping device comprising a post and lever fulcrumed thereon, one arm of said lever adapted to contact said standard, and the other arm thereof adapted to engage the tripping-chain, and a tripping-chain connecting the said standard with a fixed part of the frame, substantially as and for the purpose described.

4. In a shocking attachment for corn-harvesters, a frame mounted on a supporting-wheel and flexibly connected to the harvester-frame, a stalk-receiving and shock-forming receptacle pivotally mounted on said frame longitudinal with respect to the line of advance of said machine, and a shock-spreading device connected to the rear end of said shock-forming receptacle, all combined substantially as described.

5. In a shocking attachment for corn-harvesters, a frame mounted on a supporting-wheel and flexibly connected to the said corn-harvester frame, the said connection being made at two points, one longitudinally in advance of the other, and one of said connections, in addition to being flexible, being also made slidable for a limited distance, thus permitting the harvester to be moved a short distance rearwardly while the shocker attachment, during said movement, is caused to turn with the supporting-wheel thereof as the pivotal point, thus throwing the rear of the shocker attachment away from the harvesting-machine, a stalk-receiving and shock-forming receptacle pivotally mounted on said frame and longitudinal with respect to the line of advance of said machine, and a shock-spreading device connected to the rear end of said shock-forming receptacle, all combined substantially as described.

DARIUS TENNET PHILLIPS.

Witnesses:
J. C. WARNES,
T. H. ALFREDS.